(12) United States Patent
Yukawa et al.

(10) Patent No.: US 6,588,469 B2
(45) Date of Patent: *Jul. 8, 2003

(54) TIRE NOISE REDUCING SYSTEM

(75) Inventors: Naoki Yukawa, Kobe (JP); Tokuzo Nakajima, Kobe (JP); Masami Nishikawa, Kobe (JP); Chieko Aoki, Kobe (JP); Hideaki Sugihara, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 59 days.

This patent is subject to a terminal disclaimer.

(21) Appl. No.: 09/742,111

(22) Filed: Dec. 22, 2000

(65) Prior Publication Data
US 2001/0006084 A1 Jul. 5, 2001

(30) Foreign Application Priority Data

Dec. 24, 1999 (JP) .............................. 11-367900
Jun. 28, 2000 (JP) ........................ 2000-194958

(51) Int. Cl.$^7$ .............................. B60C 5/00; B60C 19/00
(52) U.S. Cl. ................... 152/157; 152/450; 152/378 R; 152/381.6
(58) Field of Search ................... 152/450, 151, 152/375, 378 R, 381.6, 381.3, 379.3, 155, 157

(56) References Cited

U.S. PATENT DOCUMENTS

| 4,392,522 A | 7/1983 | Bschorr |
| 4,620,580 A | 11/1986 | Groezinger et al. |
| 2001/0007268 A1 | * 7/2001 | Yukawa et al. .......... 152/381.6 |

FOREIGN PATENT DOCUMENTS

| DE | 41 20 878 A1 | 12/1992 |
| EP | 0 737 597 A1 | 10/1996 |
| JP | 07052616 A * | 2/1995 ................. 152/450 |

OTHER PUBLICATIONS

Patent Abstracts of Japan, Oct. 13, 1988, M–753, vol. 12, No. 384 (abstract of JP 63 137005 A, Jun. 9, 1988, Hand Motor Co. Ltd.).

* cited by examiner

Primary Examiner—Adrienne C. Johnstone
(74) Attorney, Agent, or Firm—Birch, Stewart, Kolasch & Birch, LLP

(57) ABSTRACT

A tire noise reducing system includes a wheel rim, a pneumatic tire mounted on the wheel rim to form an annular tire hollow, and a resonance damper disposed in the annular tire hollow, wherein the damper is one of an annular elastic loose band disposed around the rim and a flexible slack strip having a certain length and fixed to the wheel rim at two points so that a portion between the fixed points slacks, whereby a loose portion of the loose band and the slack portion of the slack strip are risen by a centrifugal force during running to at least partially block the annular tire hollow.

9 Claims, 5 Drawing Sheets

TIRE NOISE REDUCING SYSTEM

BACKGROUND OF THE INVENTION

1. Field of the Invention

The present invention relates to a tire noise reducing system, more particularly to an improved resonance damper disposed in a tire hollow and secured to a wheel rim.

2. Description of Background Art

In recent years, as the mechanical noise from automobiles especially passenger cars is greatly reduced, the tires especially passenger car tires are strongly required to reduce their noise. There are many factors in the tire noise, but a circumferential resonance of the air in the annular tire hollow is a major factor. That is, a ring of air inside the tire continuous around the rim is excited by vibrations during running and resonates in the circumferential direction. Usually, a resonance peak occurs in a frequency range of from 50 to 400 Hz according to the tire size.

In the published Japanese patent JP-B-7-14682, an assembly of a wheel rim and a pneumatic tire mounted thereon is disclosed, wherein a ball-like body which is made of rubber, sponge or the like is put in the annular tire hollow to block the circumferential continuity thereof to control resonance. Such a ball-like body is however, liable to disturb the high-speed rotational balance of the tire because the inner surface of the tire receives a full gravity of the ball-like body which increases as the rotational speed increases. Further, it has a tendency to make it difficult to mount the tire on a wheel rim.

BRIEF SUMMARY OF THE INVENTION

It is therefore, an object of the present invention to provide a tire noise reducing system, in which resonance of in the tire hollow is controlled to reduce tire noise without sacrificing the high-speed balance and rim-mounting operation.

According to the present invention, a tire noise reducing system comprises a wheel rim, a pneumatic tire mounted on the wheel rim to form an annular tire hollow, and a resonance damper disposed in the annular tire hollow, wherein the damper is one of an annular elastic loose band disposed around the rim and a flexible slack strip having a certain length and fixed to the wheel rim at two points so that a portion between the fixed points is slack, whereby a loose portion of the loose band and the slack portion of the slack strip rise by centrifugal force during running to at least partially block the annular tire hollow.

Therefore, the inner surface of the tire receives none or only a part of the gravity and the high-speed rotational balance of the tire becomes greatly improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein:.

DETAILED DESCRIPTION OF THE PREFERRED EMBODIMENTS

Figure 1:
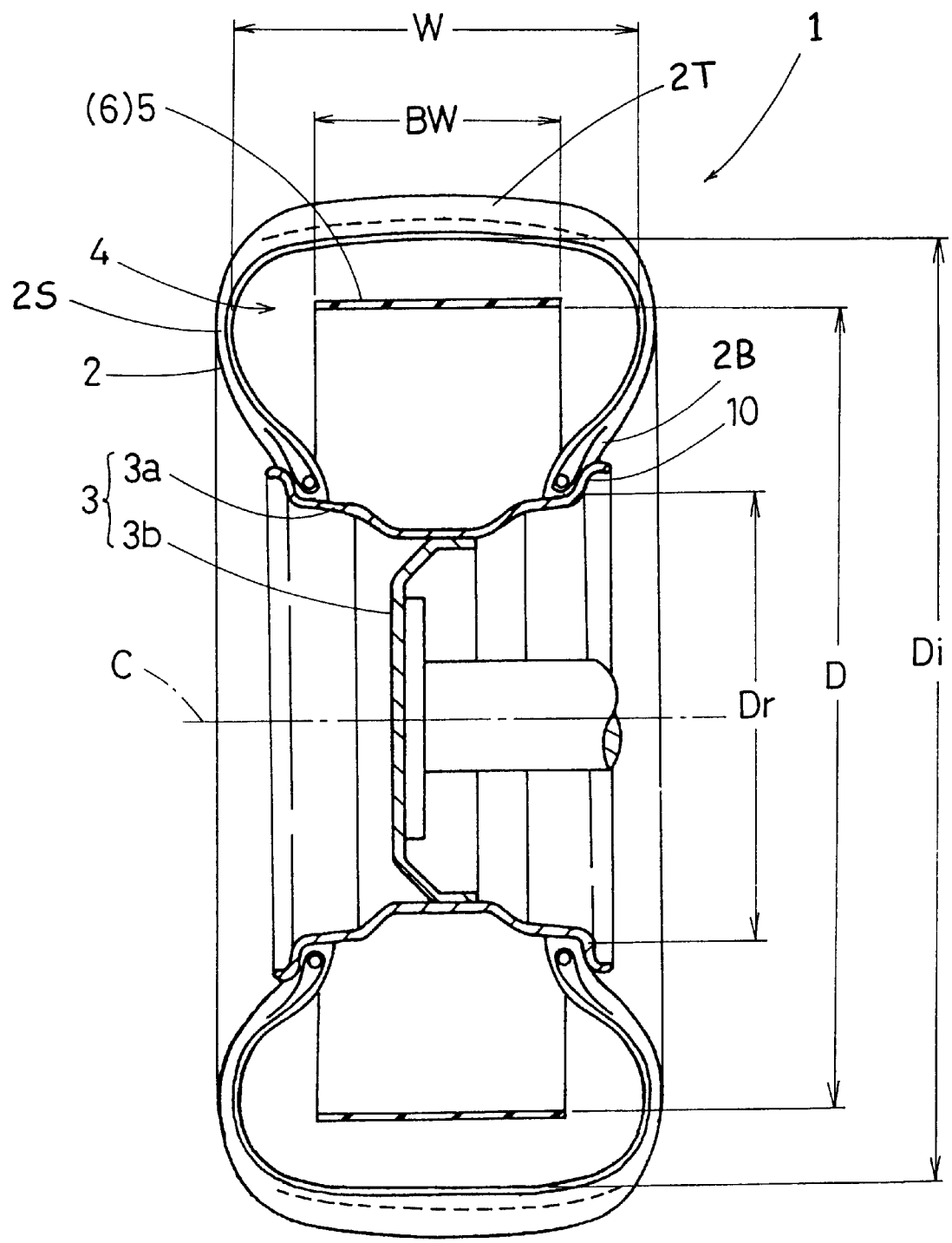
FIG. 1 is a cross sectional view of an embodiment of the present invention.

According to the present invention, a tire noise reducing system 1 comprises a pneumatic tire 2, a wheel rim 3a and a resonance damper 6.

In the drawings, the pneumatic tire 2 is mounted on the wheel rim 3a and an annular closed hollow 4 is formed around the wheel rim 3a. And the resonance damper 6 is disposed in the annular hollow 4.

The tire 2 is a tubeless tire comprising a tread portion 2T, a pair of sidewall portions 2S and a pair of bead portions 2B. In this embodiment, the tire 2 is a radial tire for passenger cars.

The wheel rim 3a is provided around a disk 3b and they make up a wheel 3. The rim 3a comprises a pair of axially spaced bead seats on which the tire bead portions 2B seat, a rim well between the bead seats, and a pair of flanges 10 each extending radially outwardly from one of the bead seats along the axially outer surface of the bead portion 2B.

The resonance damper 6 according to the present invention is made of a relatively thin flexible material and constructed to rise from the wheel rim 3a towards the tire by a centrifugal force during running and block up the annular hollow 4.

For the resonance damper 6, various elastomeric solid materials, elastomeric porous materials, fibrous materials and the like can be used.

For the elastomeric solid materials, for example, diene rubbers such as natural rubber (NR), isoprene rubber (IR), butadiene rubber (BR), styrene butadiene rubber (SBR), nitrile rubber (NBR), chloroprene rubber (CR) and the like can be used.

For the porous materials various sponge rubbers or foam rubbers of either closed-cell or open-cell foam can be used.

For the fibrous materials, nonwoven fabric made of organic fibers such as felt, a kind of paper and the like can be used. Preferably, foam rubbers, e.g. polyethylene foam and polyurethane foam are used.

Figure 2:
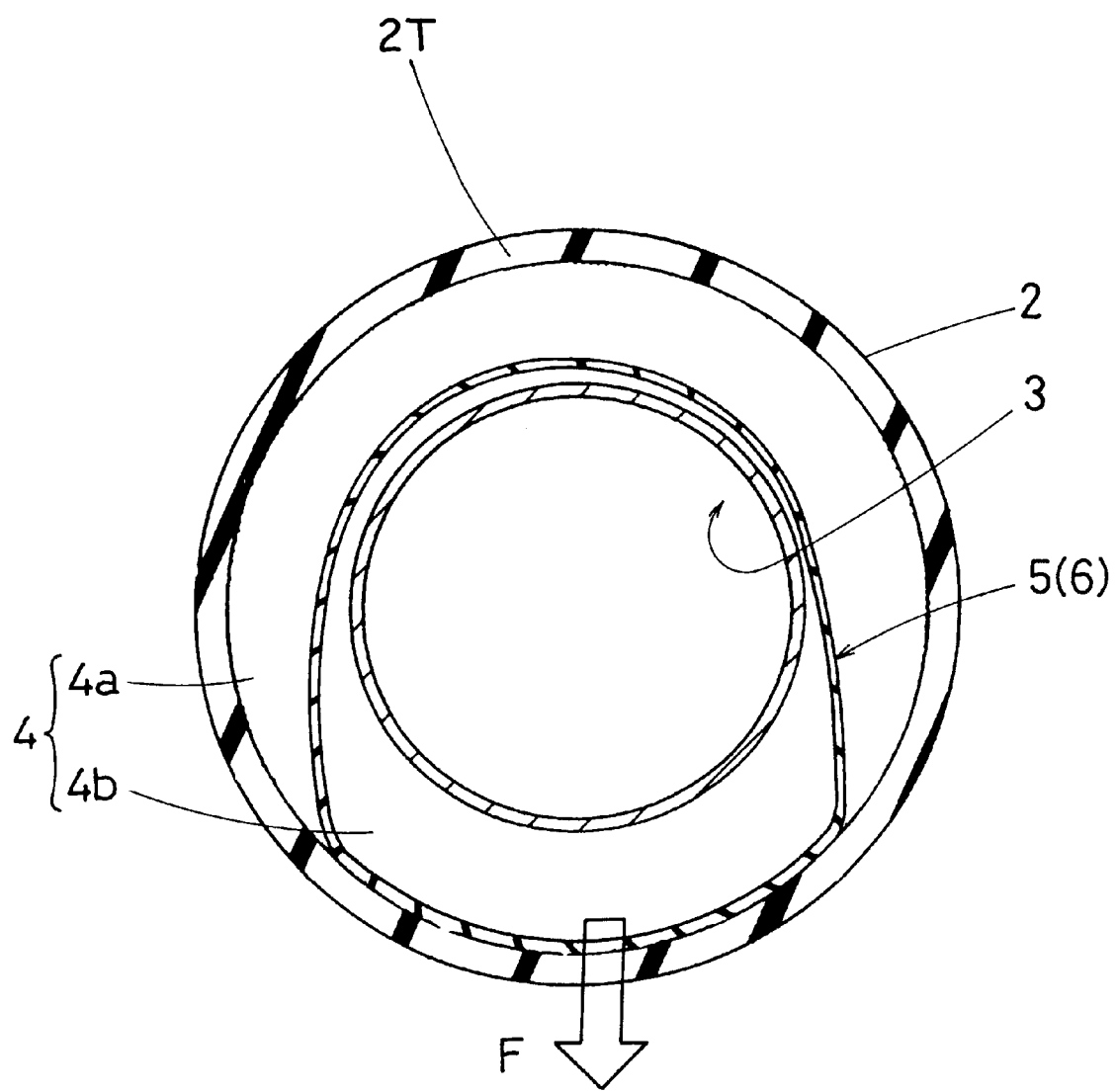
FIG. 2 is a schematic sectional view of a tire and rim assembly taken along the tire equator for showing an example of the resonance damper.

In FIG. 1 and FIG. 2, a loose band 5 is shown as an example of the resonance damper 6. The loose band 5 is a closed loop made of an elastic material and disposed around the wheel rim 3a. Thus it is secured to the wheel rim 3a.

The inside diameter D of the loose band 5 is set in a range of more than 1.02, preferably more than 1.07, more preferably more than 1.10 times the diameter Dr of the wheel rim 3a. But the inside diameter D is preferably less than 0.98, more preferably less than 0.96 times the inside diameter Di of the tire measured at the tire equator under such condition that the tire is normally inflated but loaded with no tire load.

In FIG. 1, for the sake of convenience, the loose band 5 is illustrated as if it is a circle and floats between the tire and rim coaxially with the tire.

In the example shown in FIG. 2, the loose band 5 is only put around the wheel rim 3a and fixed to neither the tire 2 nor the wheel 3. Therefore, in the annular hollow 4, the behavior of the loose band 5 caused by a force F such as gravitation, centrifugal force etc. is such that a portion comes into contact with the wheel rim 3a but an opposite portion 5c comes into contact with or near the inner surface of the tread portion 2T as shown in FIG. 2. These portions are not always a fixed portion. Their positions are changed according to the rotation as the loose band 5 is free. As a result, the loose band 5 divides the annular hollow 4 into uncertain parts for example two parts 4a and 4b in FIG. 2. Accordingly, the occurrence of standing waves in fundamental harmonic and higher harmonics can be completely prevented.

Figure 3:
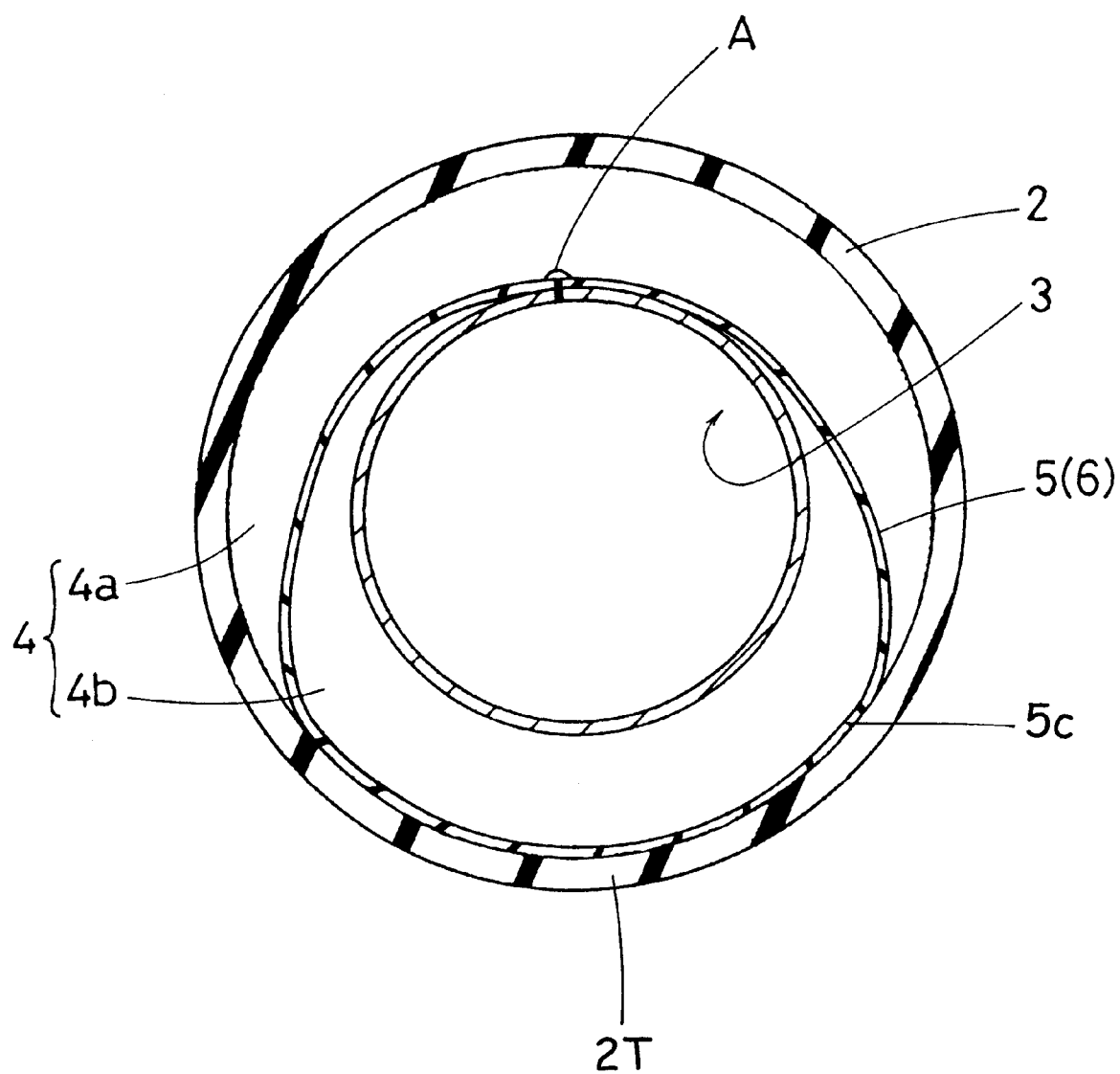
FIGS. 3–5 are sectional views each showing another example of the resonance damper.

On the other hand, in FIG. 3 which shows a modification of the example shown in FIG. 2, the loose band 5 is fixed to the wheel rim 3a at one point (A).

Figure 4:
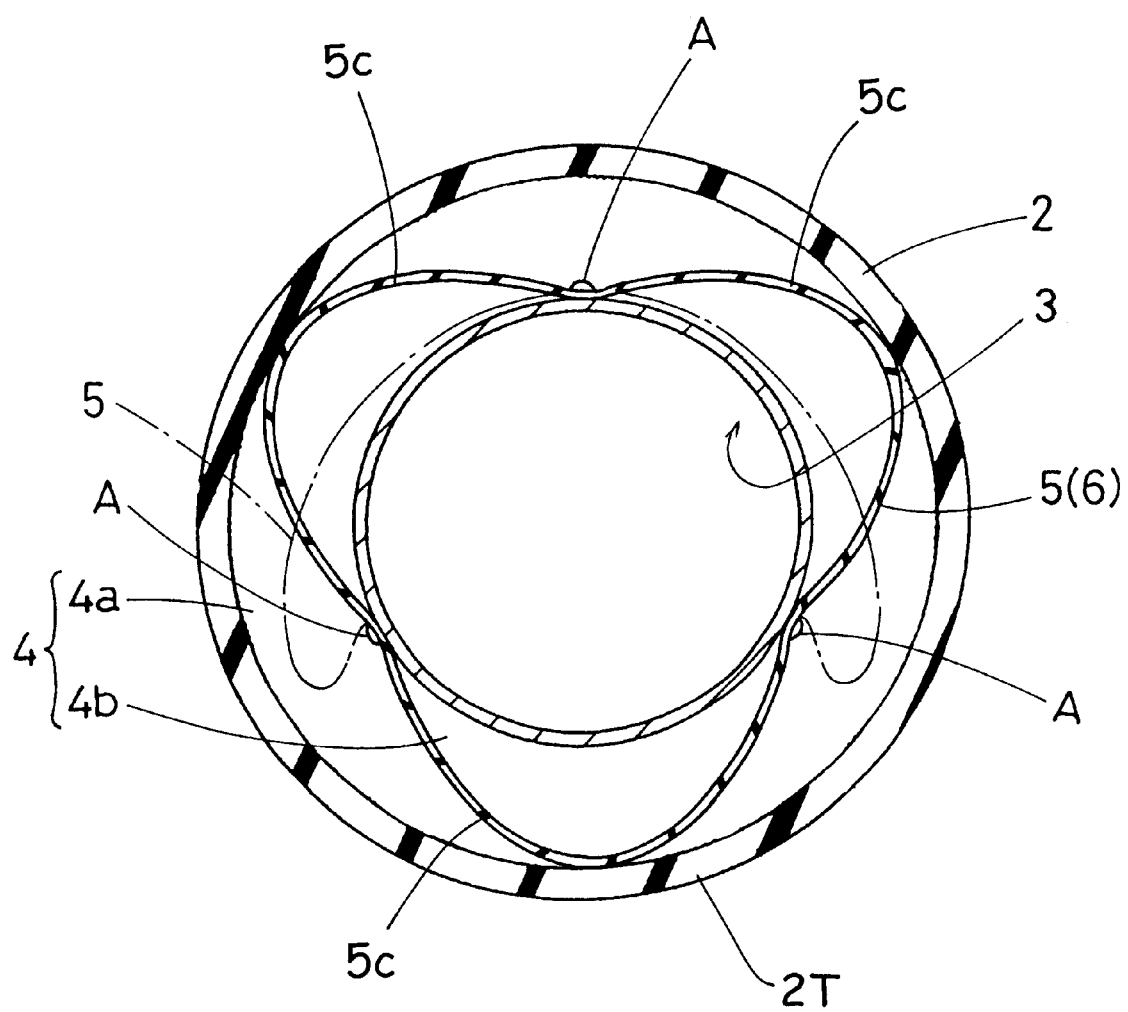

In FIG. 4 further showing another modification of the example shown in FIG. 2, the loose band 5 is fixed to the wheel rim 3a at a plurality of points (A) so that portions 5c between the fixed points (A) are slacked. Usually, the fixed points (A) are provided evenly in the circumferential direction on both the loose band and the circumference of the rim 3a to form the slack portions 5c evenly around the wheel rim 3a.

Figure 5:
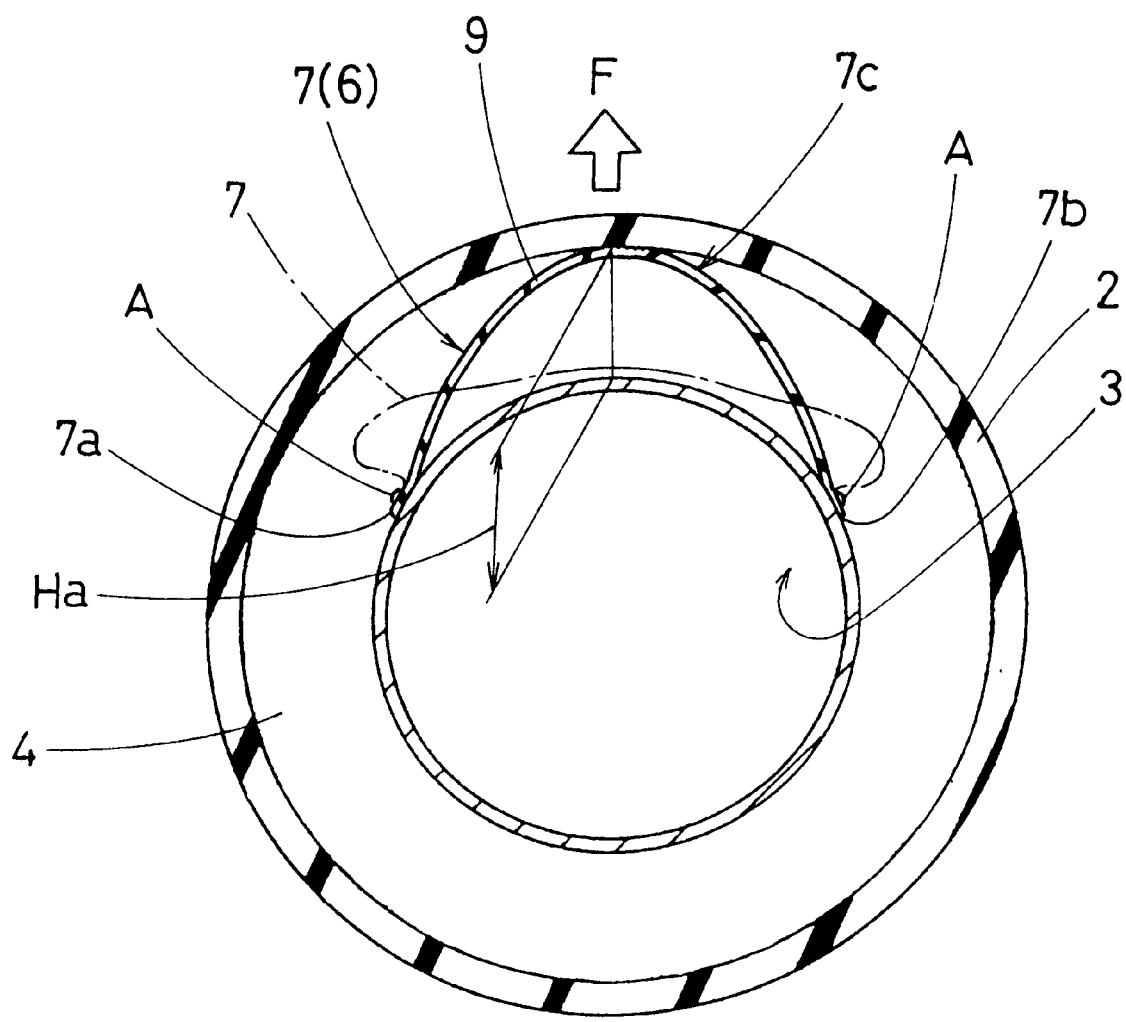

FIG. 5 shows another embodiment of the present invention wherein the resonance damper 6 is a slack strip 7 having a certain length and both ends 7a and 7b thereof are fixed to the wheel rim 3a and the portion 7c between the fixed points (A) is slacked. In FIG. 5, a single slack strip 7 is disposed, but it is also possible to provide two or more slack strips 7.

Therefore, the slacked portions 5c of the loose band 5s and the slacked portions 7c of the slack strip 7 are risen by a centrifugal force F during running.

To fix the loose bands 5 in FIGS. 3 and 4 and the slack strip 7 on the wheel rim 3a, various adhesive agents, screws, bolts and the like may be used. Preferably, they are fixed to the bottom of the rim well not to interfere tire mounting. And for the same reason, the slack portion is folded during mounting the tire.

In order to effectively block up the circumferential continuity of the annular hollow 4, the sizes of the slack portions 5c and 7c are set such that these portions rise up to a height Ha of at least 50%, preferably more than 70%, more preferably more than 100% (*1), still more preferably in a range of from 80 to 95% of the section height of the annular hollow 4 $\{=(Di-Dr)/2\}$.

1) The limitation "more than 100%" means that the portions rise up beyond the section height if the tire is removed. Thus, in the actual condition, it means that a certain area of the slack portion comes into contact with the inner surface of the tread portion as shown in FIG. 3.

In a meridian section of the tire under the normally inflated condition, the blockade area Sb or the cross sectional area of a part of the annular hollow which part is blocked by the rising slack portions 5c, 7c must be more than 30%, preferably more than 40% of the total sectional area Sa.

Therefore, in case of the above-mentioned porous materials, the width BW is set in a range of not less than 20% of the maximum width W of the annular hollow 4, and the thickness is set in a range of from 2 to 30 mm, preferably 3 to 20 mm, more preferably 3 to 10 mm.

For elastomeric solid materials and fibrous materials, the width BW is set in a range of not less than 40%, preferably not less than 45%, and more preferably from 50 to 95% of the maximum width W, and the thickness is set in a range of from 0.5 to 6 mm, preferably 0.5 to 3 mm, and more preferably 0.5 to 2 mm.

Comparison Tests

Noise test

During coasting a Japanese 2000cc FR passenger car on a noise test course (rough asphalt road) at a speed of 60 km/hr, a total sound level at 226, 240 and 253 Hz was measured near the driver's ears. In Tables 1A, 1B and 1C, the results are indicated in dB using a difference from Ref.1.

Tire size 195/65R15
Rim size 15×6JJ (Rim diameter 380.2 mm)
Tire inflation pressure 200 KPa Rim mounting test The installation of the damper and the hand mounting operation of the tire on the wheel under such a condition that the damper is already installed were evaluated by a skilled person.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

A

| Tire | Ref | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Damper | — | FIG. 2 | FIG. 3 | FIG. 4 | FIG. 5 | FIG. 5 | FIG. 5 | FIG. 5 | FIG. 5 | FIG. 5 |
| Material | — | rubber | rubber | rubber | rubber | rubber | rubber | rubber | rubber | rubber |
| Thickness (mm) | — | 1.1 | 1.1 | 1.1 | 1.1 | 1.1 | 1.1 | 1.1 | 1.1 | 1.1 |
| Width BW(mm) | — | 110 | 110 | 110 | 110 | 110 | 110 | 140 | 80 | 110 |
| BW/W(%) | — | 58 | 58 | 58 | 58 | 58 | 58 | 73 | 42 | 58 |
| Loose band | | | | | | | | | | |
| D(mm) | — | 446 | 446 | 477 | — | — | — | — | — | — |
| D/Dr | — | 1.17 | 1.17 | 1.25 | — | — | — | — | — | — |
| Slack strip | — | — | — | — | 1 | 2 | 1 | 1 | 1 | 1 |
| Number | | | | | | | | | | |
| Rising height Ha(mm) | — | — | — | — | 130 | 130 | 110 | 130 | 130 | 80 |
| Ha/H(%) *1 | — | — | — | — | 100 | 100 | 84 | 100 | 100 | 62 |
| Sb/Sa(%) *2 | — | — | — | — | 64 | 64 | 60 | 64 | 46 | 46 |
| Noise (dB) | 0 | −4 | −4.2 | −1.4 | −6.8 | −7.9 | −5 | −7.2 | −3.6 | −3.5 |
| Rim mounting | good | good | good | good | good | no good | good | good | good | good |

TABLE 1-continued

B

| Tire | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| Damper | FIG. 2 | FIG. 3 | FIG. 4 | FIG. 5 | FIG. 5 | FIG. 5 | FIG. 5 | FIG. 5 | FIG. 5 |
| Material *3 | sponge | sponge | sponge | sponge | sponge | sponge | sponge | sponge | sponge |
| Thickness (mm) | 5 | 5 | 5 | 5 | 5 | 5 | 5 | 5 | 5 |
| Width BW(mm) | 110 | 110 | 110 | 110 | 110 | 110 | 140 | 80 | 110 |
| BW/W(%) | 58 | 58 | 58 | 58 | 58 | 58 | 73 | 42 | 58 |
| Loose band | | | | | | | | | |
| D(mm) | 446 | 446 | 477 | — | — | — | — | — | — |
| D/Dr | 1.17 | 1.17 | 1.25 | — | — | — | — | — | — |
| Slack strip Number | — | — | — | 1 | 2 | 1 | 1 | 1 | 1 |
| Rising height Ha(mm) | — | — | — | 130 | 130 | 110 | 130 | 130 | 80 |
| Ha/H(%) *1 | — | — | — | 100 | 100 | 84 | 100 | 100 | 62 |
| Sb/Sa(%) *2 | — | — | — | 64 | 64 | 60 | 64 | 46 | 46 |
| Noise (dB) | −5.7 | −5.8 | −6.2 | −7.2 | −8 | −6 | −7.7 | −4.5 | −5 |
| Rim mounting | good | good | good | good | no good | good | good | good | good |

C

| Tire | Ex. 19 | Ex. 20 | Ex. 21 | Ex. 22 |
|---|---|---|---|---|
| Damper | FIG. 2 | FIG. 2 | FIG. 2 | FIG. 2 |
| Material *3 | sponge | sponge | sponge | sponge |
| Thickness (mm) | 10 | 10 | 10 | 10 |
| Width BW(mm) | 110 | 90 | 70 | 50 |
| BW/W(%) | 58 | 47 | 37 | 26 |
| Loose band | | | | |
| D(mm) | 446 | 446 | 446 | 446 |
| D/Dr | 1.17 | 1.17 | 1.17 | 1.17 |
| Rising height Ha(mm) | — | — | — | — |
| Ha/H(%) 1 | — | — | — | — |
| Sb/Sa(%) 2 | — | — | — | — |
| Noise (dB) | −6.4 | −4.8 | −4 | −3.6 |
| Rim mounting | good | good | good | good |

*1) Section height H = (Di-Dr)/2 of tire annular hollow = 130 mm
*2) Sectional area Sa of tire annular hollow = 189.8 sq.cm
*3) Polyurethane foam (Specific gravity 0.022)

What is claimed is:

1. A tire noise reducing system, comprising:
   a wheel rim,
   a pneumatic tire mounted on the wheel rim to form an annular tire hollow, and
   a resonance damper disposed in the annular tire hollow, wherein the damper is one of an annular elastic loose band disposed around the rim and a flexible slack strip having a certain length and fixed to the wheel rim at two points so that a portion between the fixed points is slack, whereby a loose portion of the loose band and the slack portion of the slack strip rise by centrifugal force during running to at least partially block the annular tire hollow, wherein the maximum rising height Ha of the loose portion and the slack portion is in the range of from 80–95% of the section height of the annular hollow.

2. The tire noise reducing system according to claim 1, wherein the annular loose band is not fixed to the tire or to the wheel rim.

3. The tire noise reducing system according to claim 1, wherein the annular loose band is fixed to the wheel rim at one or more points.

4. The tire noise reducing system according to claim 1, wherein the resonance damper is made of an elastomeric porous material.

5. The tire noise reducing system according to claim 4, wherein the resonance damper has a width in a range of not less than 20% of the maximum width of the annular tire hollow, and a thickness in a range of from 2 to 30 mm.

6. The tire noise reducing system according to claim 1, wherein the resonance damper is made of an elastomeric solid material.

7. The tire noise reducing system according to claim 6, wherein the resonance damper has a width in a range of not less than 40% of the maximum width of the annular tire hollow, and a thickness in a range of from 0.5 to 6 mm.

8. The tire noise reducing system according to claim 1, wherein the resonance damper is made of a fibrous material.

9. The tire noise reducing system according to claim 8, wherein the resonance damper has a width in a range of not less than 40% of the maximum width of the annular tire hollow, and a thickness in a range of from 0.5 to 6 mm.

* * * * *